(12) United States Patent
Thut (10) Patent No.: US 10,197,054 B2
(45) Date of Patent: Feb. 5, 2019

(54) POSITIVE DISPLACEMENT TRANSFER GEAR PUMP FOR MOLTEN METAL

(71) Applicant: Bruno H. Thut, Chagrin Falls, OH (US)

(72) Inventor: Bruno H. Thut, Chagrin Falls, OH (US)

(*) Notice: Subject to any disclaimer, the term of this patent is extended or adjusted under 35 U.S.C. 154(b) by 0 days.

(21) Appl. No.: 15/431,581

(22) Filed: Feb. 13, 2017

(65) Prior Publication Data

US 2018/0230995 A1    Aug. 16, 2018

(51) Int. Cl.
*F04C 13/00* (2006.01)
*B22D 17/08* (2006.01)
(Continued)

(52) U.S. Cl.
CPC ............ *F04C 13/005* (2013.01); *B01D 29/66* (2013.01); *B01D 39/2093* (2013.01);
(Continued)

(58) Field of Classification Search
CPC ................................ B22D 17/12; F04D 7/065
See application file for complete search history.

(56) References Cited

U.S. PATENT DOCUMENTS

| 582,405 | A | 5/1897 | Stifel |
| 3,976,405 | A | 8/1976 | Gieger et al. |
| 4,444,377 | A | 4/1984 | Groteke et al. |
| 5,286,163 | A | 2/1994 | Amra et al. |
| 6,612,821 | B1 | 9/2003 | Kuijpers et al. |

(Continued)

OTHER PUBLICATIONS

Geoffrey K. Sigworth, Aluminum Degassing Methods & Measurements, excerpt from 2014 book, "Best Practices in Aluminum Metalcasting," Modern Casting, Published by American Foundry Society, 2014. 4 pgs, http://www.afsinc.org/multimedia/contentMC.cfm?ItemNumber=18281.
Understanding Positive Displacement Pumps, PumpScout, 3 pgs., http://www.pumpscout.com/articles-expert-advice/understanding-positive-displacement-pumps-aid89.htm.
(Continued)

*Primary Examiner* — Scott R Kastler
(74) *Attorney, Agent, or Firm* — Abel Law Group, LLP (57) ABSTRACT

A self-cleaning transfer gear pump for transferring molten metal includes the following features: a transfer conduit extends upward from an outlet of a base, two rotatable gears are formed of refractory material and disposed in the gear chamber and engage each other during rotation. A boss functioning as a bearing extends from the drive gear and is adapted to be received in an opening in the base. A shaft is fastened at a lower end to the drive gear. A filter is fastened to the base so as to cover the inlet and prevents particles and objects in the molten metal from entering the gear chamber. In operational mode, a motor rotates the shaft and the drive gear whereby the drive gear and the second gear engage each other while being rotated so as to positively displace molten metal from the inlet to the outlet and along the transfer conduit to the remote location. In self-cleaning mode, the motor rotates the shaft and the drive gear effectively to draw molten metal from the transfer conduit by positive displacement, through the outlet, and toward the inlet therefore cleaning the filter by removing the particles adhering to the filter. Also included are a system with optional filter and optional self-cleaning mode but including an inlet portion of a die casting machine, and a method for operating the gear pump. A flow sensor may be used to transmit pulses into and from the transfer conduit so as to enable determination of a volume of molten metal being charged. The control of the molten metal volume being charged is not solely controlled by the flow sensor.

13 Claims, 7 Drawing Sheets

(51) Int. Cl.
*B22D 17/30* (2006.01)
*F27D 27/00* (2010.01)
*F04C 14/04* (2006.01)
*F04C 2/18* (2006.01)
*B01D 29/66* (2006.01)
*B01D 39/20* (2006.01)

(52) U.S. Cl.
CPC ............ *B22D 17/08* (2013.01); *B22D 17/30* (2013.01); *F04C 2/18* (2013.01); *F04C 13/001* (2013.01); *F04C 14/04* (2013.01); *F27D 27/005* (2013.01)

(56) References Cited

U.S. PATENT DOCUMENTS

| | | |
|---|---|---|
| 6,630,028 B2 | 10/2003 | Briese et al. |
| 6,692,689 B2 | 2/2004 | Morando |
| 8,172,740 B2 | 5/2012 | El Dorry et al. |
| 2004/0231820 A1* | 11/2004 | Hirai ..................... B22D 17/04 164/113 |

OTHER PUBLICATIONS

Chemical Gear Pumps GX Series/The Best Chemical Handling, 4 pgs., http://www.iwakipumps.jp/en/products/rotary/gx.
B-Series, Models 1, 2, 3 & 4 Rotary Gear Pumps, Clark Solutions, 2016, 6 pgs., http://www.clarksol.com/html/prodspecsB_SeriesPump.cfm.

* cited by examiner

POSITIVE DISPLACEMENT TRANSFER GEAR PUMP FOR MOLTEN METAL

TECHNICAL FIELD

This disclosure relates to pumps for molten metal and in particular, to a gear pump for transferring molten metal.

BACKGROUND

A variety of pumps are known for pumping molten metal. One type of centrifugal pump typically includes a submerged base including an impeller chamber that receives a rotatable impeller. The impeller may include vanes and/or passages for directing the molten metal during pumping. The base is submerged in a well that contains molten metal in a furnace. A motor driven shaft is fastened to the impeller and rotates it. Rotation of the impeller causes molten metal to be drawn into the base inlet, through the impeller chamber and to flow through an outlet. The pump may be a circulation or transfer pump.

Impeller based pumps do not positively displace molten metal. There is not a close correspondence to the volume that is inlet compared to the volume that is outlet. Centrifugal pumps are somewhat inefficient. It has been a long felt but unresolved problem in molten metal processing to produce a charge of molten metal of defined volume. To pump at high pressure and/or to pump small charges of metal cannot be accomplished with this type of impeller based centrifugal pump.

Centrifugal pumps also operate at high rpm and often in a dirty environment. Debris that enters the impeller chamber can cause catastrophic failure of the impeller and/or shaft. Such pumps typically have a short lifetime in the harsh molten metal environment.

The molten metal furnace or vessel containing molten metal is often located relatively close to a die casting machine at the same facility. One modern way that molten metal is transferred to die casting machines is through the use of robots; which move to receive and transfer the molten metal in defined volumes for die casting metal parts of particular, often complex shapes. However, robots present very high capital and maintenance costs and sophisticated personnel to operate and modify the movements of the robots. Robots can also be dangerous as they operate quickly and at high force, which can injure workers. Of course robot malfunctioning is also a dangerous risk when the robots work with molten metal.

The molten metal processing industry is also demanding higher and higher purity metal parts. Impurities can result from the presence of oxides and other particles. For example, a part with a pinhole defect used in a transmission of a motor vehicle can ruin the resultant parts or lead to premature failure. This can be reduced by adding fluxes to the molten metal by a degassing operation and by physically skimming to remove dross. These are labor intensive and dangerous operations due to the addition of flux chemicals and gases to the molten metal and proximity of workers to the furnace of molten metal.

TECHNICAL SUMMARY

One aspect of the disclosure features a self-cleaning transfer gear pump for transferring molten metal. The gear pump includes the following features: a base including an interior gear chamber, an inlet, an outlet and a shaft opening. The base is formed of refractory material and is adapted to be submerged in molten metal. A transfer conduit extends upward from the outlet of the base to above the surface of the molten metal and to a remote location. Two rotatable gears are formed of refractory material and disposed in the gear chamber: the drive gear and the second gear.

The drive gear and the second gear engage each other during rotation. A boss functioning as a bearing extends from the drive gear and is adapted to be received in an opening in the base. A shaft is formed of refractory material. The shaft passes through the shaft opening of the base and is fastened at a lower end to the drive gear. Included is a motor to which an upper end of the shaft is rotatably connected. The motor is supported above the molten metal. A filter is fastened to the base so as to cover the inlet. The filter is formed of a refractory material that prevents particles and objects in the molten metal from entering the gear chamber. In operational mode, the motor rotates the shaft and the drive gear. The drive gear and the second gear engage each other while rotating so as to positively displace molten metal from the inlet to the outlet and along the transfer conduit to the remote location. In self-cleaning mode, the motor rotates the shaft and the drive gear to draw molten metal, by positive displacement, from the transfer conduit, through the outlet and toward the inlet cleaning the filter by removing the particles adhering to the filter.

Features of the first aspect of the disclosure include: gear design, filter formation, metering means and flow sensor. The gear chamber can be designed to limit molten metal flow to locations between intermeshed teeth of the gears and around the drive gear and the second gear. The filter can be formed of a ceramic foam or a porous ceramic material. The drive gear and the second gear are formed of ceramic material. The gear pump includes means for metering the positively displaced molten metal from the transfer conduit as a precise charge of molten metal to an inlet of a die casting machine that is disposed at the remote location. The gear pump of the first aspect includes a flow sensor located only exterior to the riser or the transfer conduit. The flow sensor is adapted to transmit pulses into the transfer conduit and to receive pulses from the transfer conduit. These pulses are adapted to be used to determine a flow rate of molten metal traveling in the transfer conduit and a volume of molten metal that is transferred. The means of controlling the molten metal amount is not solely controlled by the flow sensor.

A second aspect of the disclosure features a system for die casting molten metal, comprising the transfer gear pump of the first aspect except that the filter and self-cleaning mode are optional. Also included in the system is a die casting machine forming molten metal into metal articles of specific shapes. The die casting machine includes an inlet portion for receiving a charge of molten metal to be formed. The transfer conduit extends from the outlet of the base to an inlet portion of the die casting machine.

All of the features of the first aspect are applicable to the second aspect in any combination. In addition, any features discussed in the Detailed Description are applicable to both the first and second aspects of the disclosure in any combination.

One specific feature of the second aspect is that the drive gear and the second gear can be formed of ceramic material. The size of the drive gear and the second gear, and at least one of a size, shape and pitch of teeth on the drive gear and the second gear are selected so that engagement of the teeth of the drive gear and the second gear produces the positive displacement resulting in the charge of molten metal. Another feature of the second aspect is that the system can include a flow sensor adapted to transmit and receive pulses into and from the conduit. The pulses are used to determine a flow rate of molten metal in the conduit and a volume of the charge; the flow sensor only being located exterior to the transfer conduit. Yet another feature of the second aspect is that the system includes a controller. The determination of the flow rate and the charge volume using the transmitted and received pulses is carried out by the controller, enabling adjustment of the motor to rotate the gears to transfer the charge volume of molten metal into the inlet portion of the die casting machine.

A third aspect of the disclosure features a method of transferring molten metal comprising the gear pump of the first aspect. The shaft is rotated during operation to rotate the drive gear and the second gear to positively displace molten aluminum through the transfer conduit to the remote location (e.g., to the inlet portion of a die casting machine). The shaft is rotated during the self-cleaning operation under conditions that remove molten aluminum from the transfer conduit using positive displacement to backflush the filter that cleans the filter. Another feature is that the method can act on unfoamed molten aluminum, which is less viscous than foamed molten aluminum.

It should be understood that the above Summary of the Disclosure describes embodiments of the disclosure in broad terms while the following Detailed Description describes embodiments of the disclosure more narrowly and presents specific embodiments that should not be construed as necessary limitations of the invention as broadly defined in the claims. Many additional features, advantages and a fuller understanding of the invention will be had from the accompanying drawings and the Detailed Description that follows.

DETAILED DESCRIPTION

Figure 1:
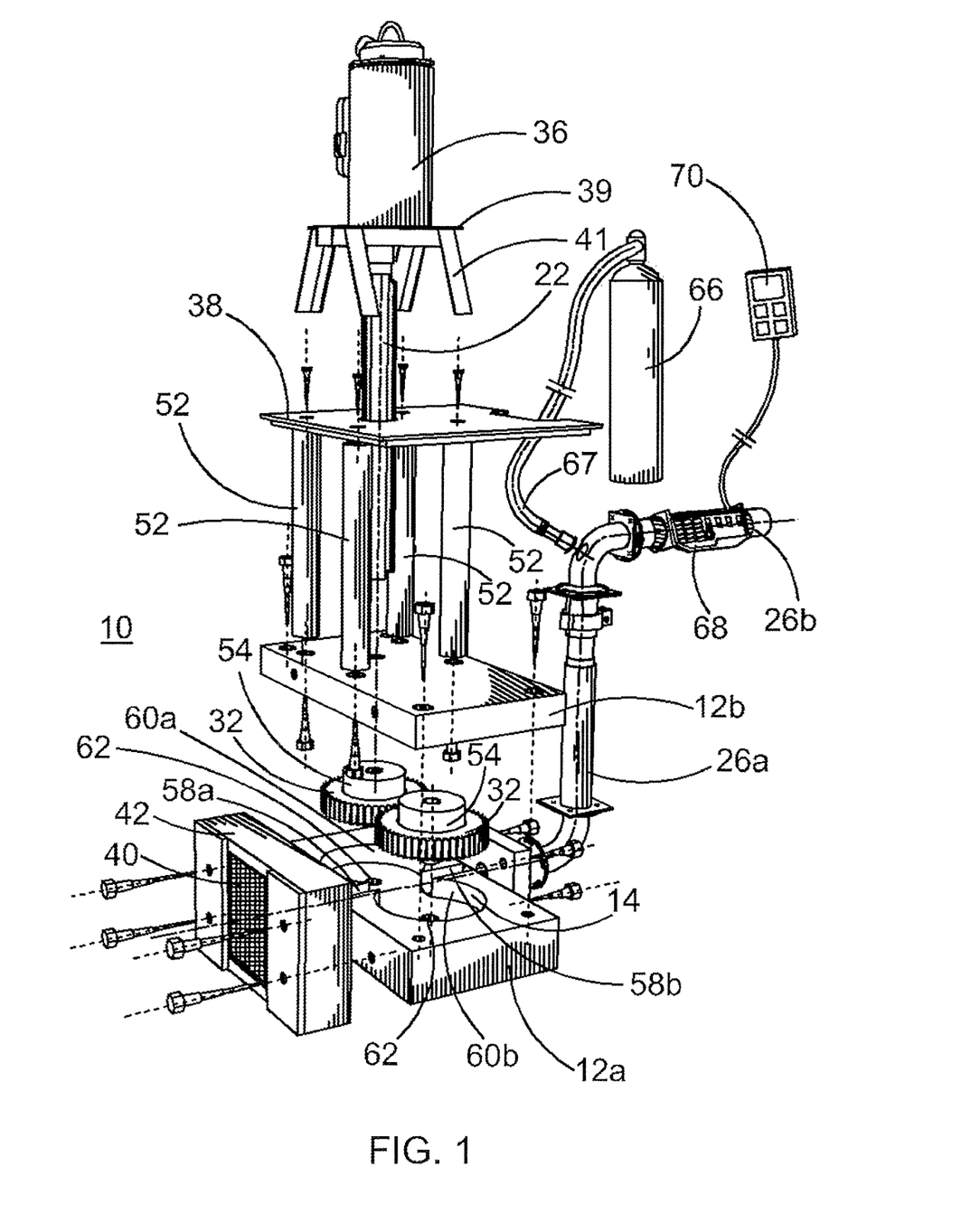
FIG. 1 is an exploded perspective view of the transfer gear pump of this disclosure.
Figure 2:
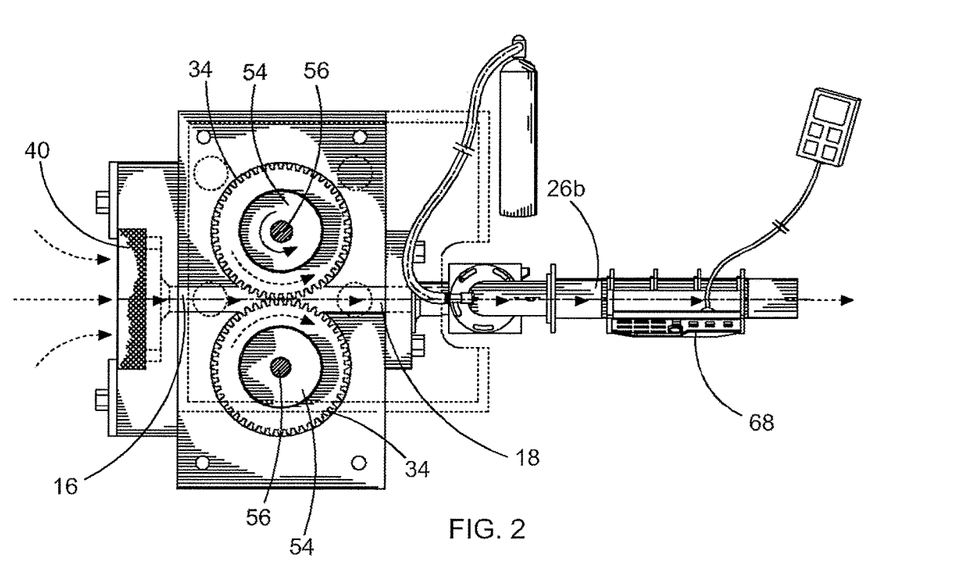
FIG. 2 is a top plan view of the base of the gear pump of this disclosure.
Figure 3:
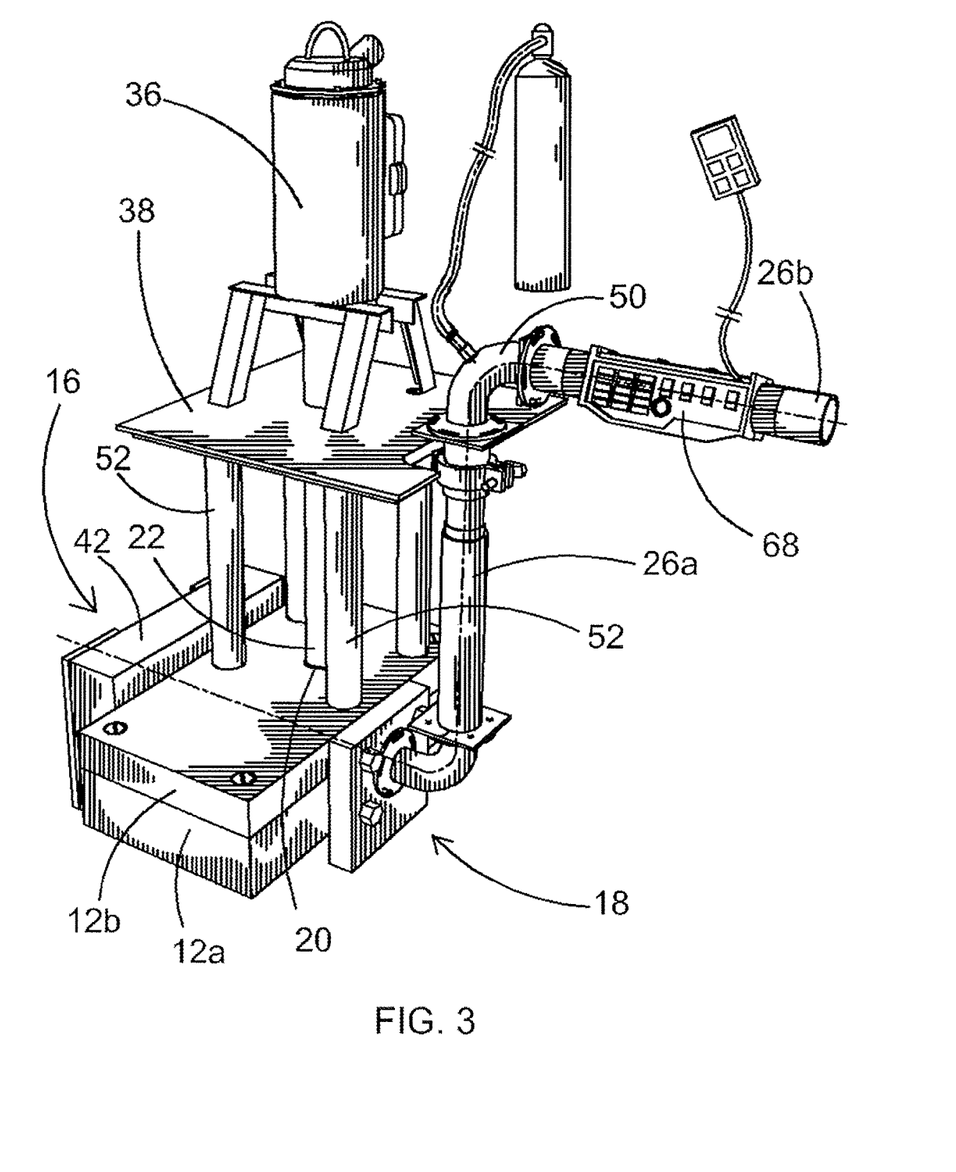
FIG. 3 is a rear perspective view of the gear pump of this disclosure.
Figure 4:
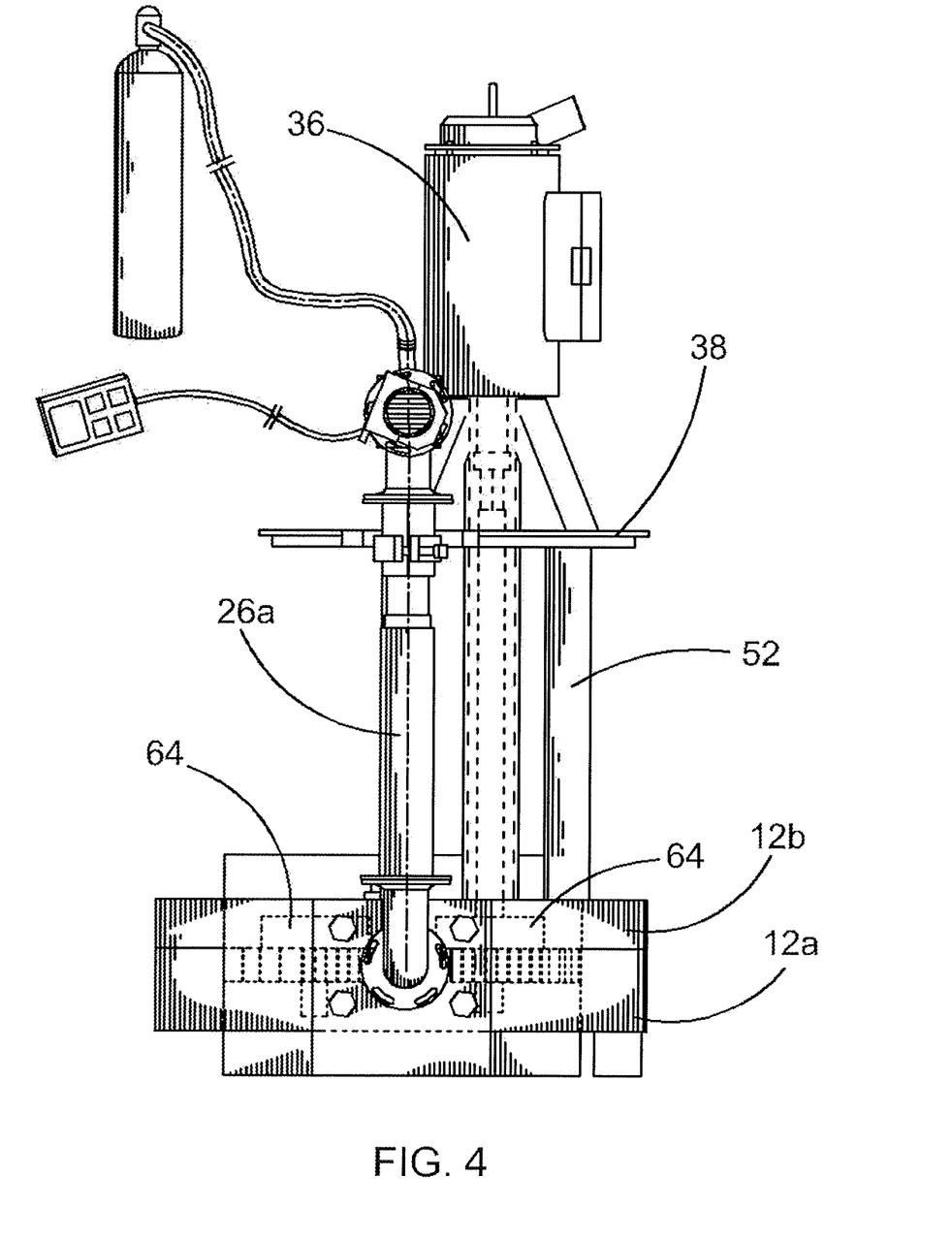
FIG. 4 is a rear view of the gear pump of this disclosure.
Figure 5:
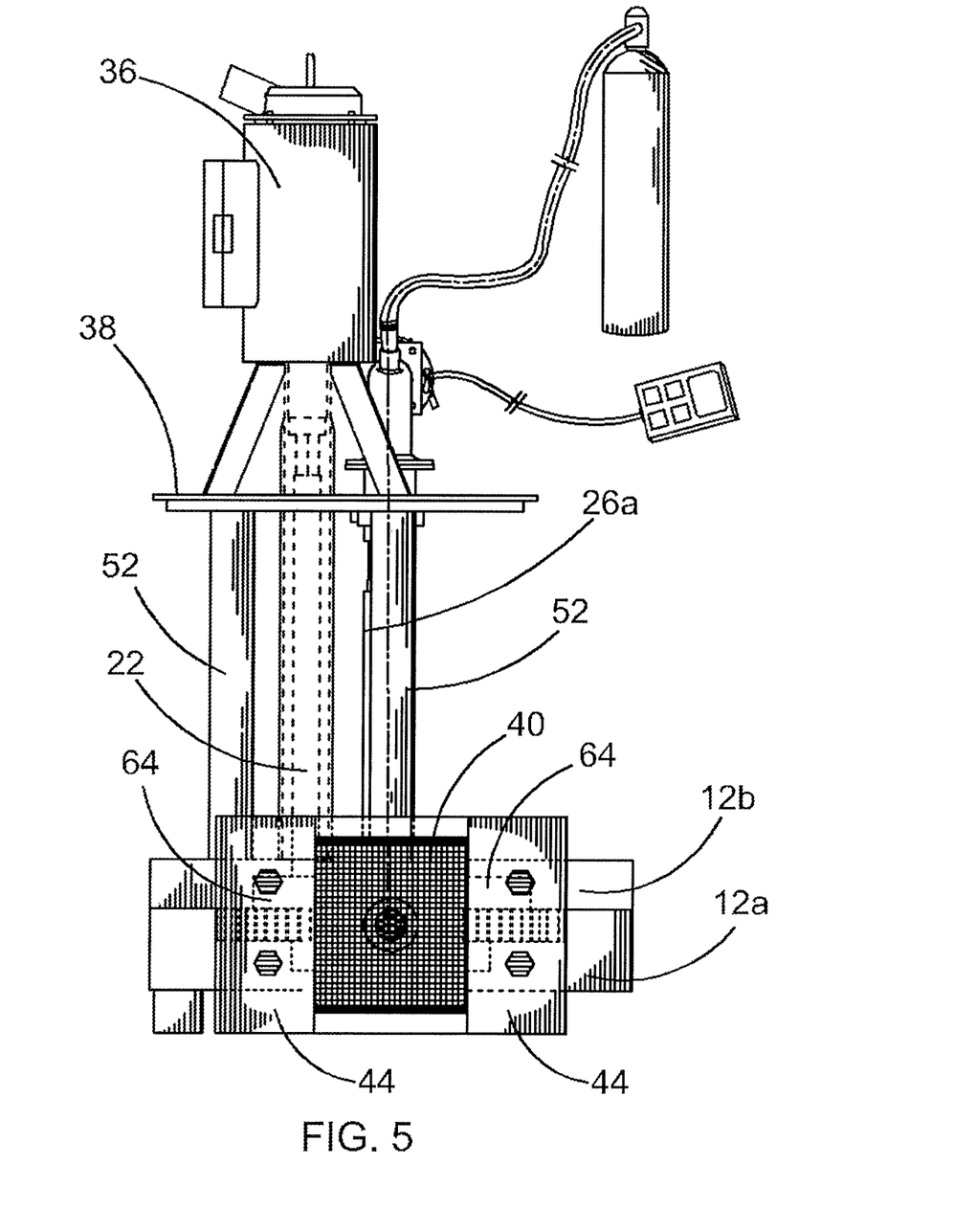
FIG. 5 is a front view of the gear pump of this disclosure.
Figure 6:
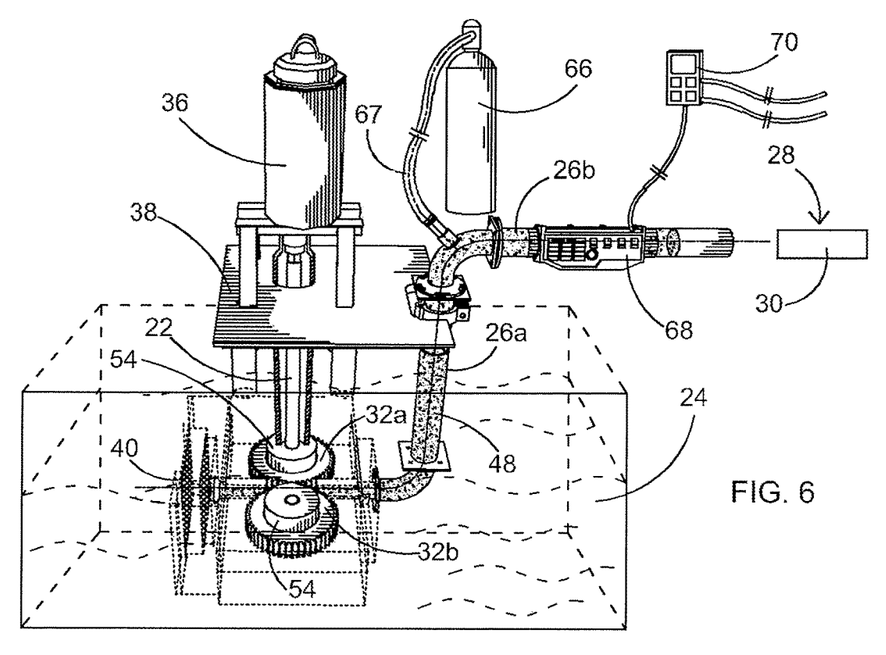
FIG. 6 is a perspective of the right side of the gear pump of this disclosure while transferring molten metal through the transfer conduit to a remote location. This also shows a non-contact flow sensor that can be used to measure flow and determine volume of metal being transferred.

This disclosure features a transfer gear pump (10) for transferring molten metal. A base (12) includes an interior gear chamber (14), an inlet (16), and outlet (18) and an opening (20) for receiving a refractory shaft (22). The base (12) is formed of refractory material and is adapted to be submerged in the molten metal (24). A transfer conduit includes a first transfer conduit portion or riser (26a), which extends from the outlet to above the molten metal. The riser may be formed of graphite. A second transfer conduit portion (26b) extends from the upper end of the riser to a remote location (28) (e.g., into a shot sleeve of a die casting machine). An inlet portion (30) of a die casting machine is shown schematically in FIG. 6. Two rotatable gears (32) formed of heat-resistant material are disposed in the gear chamber (14). One of the gears is a drive gear (32a) while the other, second gear, may be a drive gear or a driven gear (32b). In a particular design, the drive gear (32a) and the second, driven gear (32b) (idle gear) are employed. The gears (32a) and (32b) engage each other during rotation so that their teeth (34) intermesh in a known manner of gear pumps. The shaft (22) is formed of refractory material and is fastened at a lower end to the drive gear (32a). The shaft (22) is rotatably connected at its upper end to a motor (36). The motor (36) can be supported above the molten metal by a motor mount plate (38). Adaptor plate (39) contacts the motor which is positioned over the motor mount plate by the legs (41). In the operational mode, the motor (36) rotates the shaft (22) and the attached drive gear (32a). This engages the second driven gear (32b) to positively displace molten metal from the inlet (16) to the outlet (18), along the riser (26a) and along the second transfer conduit portion (26b) to the remote location (FIGS. 2 and 6). A separate refractory shaft need not be directly connected to the second gear.

Figure 7:
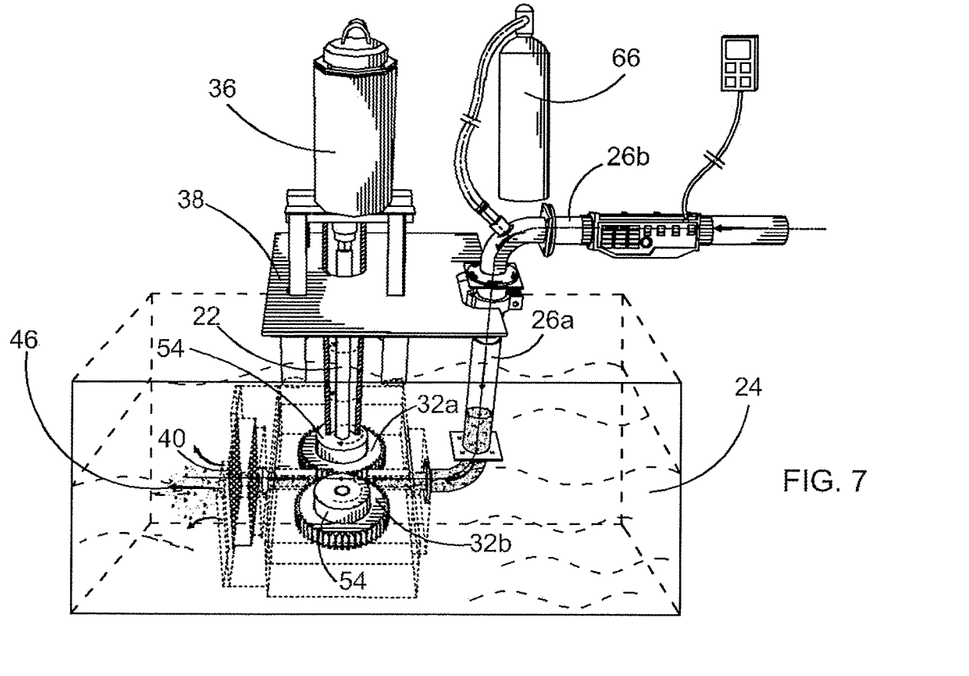
FIG. 7 is another perspective of the right side of the gear pump of this disclosure while carrying out a self-cleaning operation that removes particles adhering to a filter of the pump. The molten metal travels by positive displacement from the transfer conduit through the filter in the direction of the arrows.

In one embodiment, a filter (40) is fastened to the base so as to cover the inlet (16). The filter (40) is formed of a refractory material that prevents particles and objects in the molten metal from entering the gear chamber. The filter may be received in a filter block (42) that traps the filter in place with fastened plates (44) over the inlet of the base. In self-cleaning mode, the motor (36) rotates the refractory shaft (22) and the drive gear (32a) in an opposite or reverse direction. This engages the driven gear (32b) effectively to draw molten metal from the riser (26a) toward the outlet (18) and then the inlet (16). This backflushes the filter and cleans it by removing particles (46) adhering to the filter (FIG. 7). Typically, the drive gear would rotate in one direction during normal transfer pumping operation and in the opposite direction during the self-cleaning operation. The idle gear would rotate opposite to the rotation of the drive gear.

The riser (26a) that leads from the base to above the bath and/or the second transfer conduit portion (26b) that extends from the riser to the remote location can be heat insulated and/or made of metal or refractory material and can be formed of multiple conduit sections, elbows and the like. For example, the riser (26a) made of refractory is fastened to the base around the outlet and extends vertically to the metal motor mount plate. A passageway (48) extends through the riser. The riser (26a) may be supported at its upper end by an optional fastener connecting it to the motor mount plate. At an upper location of the riser (26a), a flanged elbow (50) may be fastened at one end. Attached to the downstream end of the flanged elbow (50) is the second transfer conduit portion (26b) that leads to the remote location (28). The second transfer conduit portion (26b) may be formed of metal, refractory or other material and can include insulation to prevent heat loss from the molten metal inside of it.

One or more refractory posts (52) can extend between the base and the motor mount plate to support the base submerged in the molten metal and the motor mount above the molten metal. The outlet (18) from the base can be on a side of the base (12) or an upper surface of the base (12) depending on the design.

A boss (54) that functions as a bearing is located against an upper surface of the gears. A rod (56) may extend inside each of the gears and protrude out of the bottom surface of the gears. The rods (56) may be firmly connected to the gears and/or the bearing members and enable the gears to rotate about an axis of rotation running along an axis of the refractory shaft (22) or, if no shaft is directly connected to the gear, along the rod (56). The base includes a lower section (12a) constructed and arranged to include an inlet passageway (58a) from the inlet opening (16), to the gear chamber (14) and an outlet passageway (58b) extending from the gear chamber to the outlet opening (18). The gear chamber (14) has lobe openings (60a) and (60b) sized and shaped closely to match that of the gears but slightly oversized to permit gear rotation. The lower base section may include cylindrical openings (62) that receive the rods (56) on which the gears rotate. The upper base section (12b) includes two openings (64) approximately the size and shape of the bearing members (54) and optional bearing rings (disc shaped openings). The upper base section (12b) also includes the opening (20) for receiving the refractory shaft (22). Either or both of the lower rod openings or the upper bearing openings may also include ceramic material to resist abrasion. For example, the base (12) could include a bearing ring around each of the boss bearings (54). The upper and lower base sections are fastened to each other using refractory fasteners. The rods (56) may be made of a refractory material, for example, ceramic material. Thus the rods may also function as bearings and may engage a ceramic bearing in the base (e.g., each rod may rotate in a ring shaped bearing or cap fixed inside the base). The base may include suitable seals, for example, mechanical seals.

An advantageous system includes the gear pump of this disclosure adapted to charge a shot sleeve (30) of a die casting machine. For example, the transfer conduit (26) extends to the shot sleeve so as not to be exposed to air or exposed to limited air. Operation of the gear pump positively displaces the molten metal into the shot sleeve at a predetermined charge.

The gear pump can employ an inert gas source (66) such as a tank of pressurized gas and conduit (67) (along suitable valves and fittings) that is connected to the riser (26a) or second transfer conduit portion (26b) of the gear pump. The insert gas source is only shown schematically in the figures and is not to scale. The inert gas may flow via conduit (67) along the transfer conduit portion (26b) toward the shot sleeve and/or down into the riser (26a) toward the base (12). The flowing inert gas (e.g., nitrogen and/or argon) prevents oxidation of the molten metal. In a further aspect, the transfer conduit can be sealed to the shot sleeve and the inert gas is pressurized and used to lower a volume of the molten metal in the riser near or to the level of the bath in the well in which the base is submerged. This avoids freezing of molten metal in the riser and/or transfer conduit. The metal in the riser, thus, has a similar temperature to the molten metal in the bath, thereby avoiding cooling of a large quantity of metal in the riser.

When the pump is operated, the intermeshed engagement of the teeth of the gears results in a suction side at the inlet opening (16) and a pressure side at the outlet opening (18). This pulls the molten metal into the inlet, through the gear chamber, so as to leave the outlet into the riser. Along with the metal, particles (46) are also pulled toward the inlet and become caught in the filter (40). Larger objects in the molten metal such as pieces of refractory brick or oxides may also be drawn toward the pump inlet and are prevented from entering the gear chamber by the filter (40). When desired, the pump can be operated in the self-cleaning mode and pulls molten metal by positive displacement from the riser and/or second transfer conduit portion to the pump outlet as the suction side, and then to the pump inlet as the pressure side, which backflushes the filter. This removes particles (46) adhering to the filter, which is greatly advantageous to repeatedly transfer clean molten metal to the die casting machine without pumping down time being needed for cleaning the filter. This gear pump design advantageously results in cleaner molten metal being transferred and thus, higher quality cast metal parts.

Moreover, because the gear pump operates by positive displacement, the cleaning is unique in that it can occur using a relatively small amount of molten metal and not by rotating the shaft (22) at high rpms. For example, after charging the shot sleeve (30) there may be residual molten metal in the riser (26a) or in a range of locations from the bath level to the top of the elbow. For example, if pressurized inert gas is used to lower the molten metal in the riser to approximately a bath level, there is a relatively small amount of molten metal available in the riser. Surprisingly, a relatively small volume is believed to be all the pump needs to achieve effective back flushing in view of the efficient positive displacement pumping of the gear pump.

The filter (40) can be formed of various materials. A porous ceramic material may be employed. One possibility may be ceramic foam. The filter may be in the form of a rectangular body. The gears (32) can be formed of ceramic material. The gears can have a selected size. At least one of a size, shape and pitch of teeth on the gears are selected so that engagement of the teeth of the gears produces the positive displacement resulting in the charge of molten metal.

A non-contact flow sensor (68), shown schematically and not necessarily to scale (FIG. 6), can be employed to transmit and receive ultrasonic pulses into and from the transfer conduit (26a) and/or (26b). The pulses are used to determine precise charge of molten metal delivered to the inlet portion or shot sleeve of the die casting machine. One example of a suitable non-contact flow sensor is the FD-Q™ series non-contact flow sensor by Keyence; the current brochure and installation/operating manuals on the Keyence website being incorporated herein by reference in their entirety. The flow rate of the molten metal traveling in the transfer conduit (26a) and/or (26b) is measured by the flow sensor (68), such as using ultrasound pulses transmitted and received. A controller (70) (shown schematically and not to scale in FIG. 6) uses this information about flow rate to determine the volume of metal being discharged. One suitable controller is a programmable logic controller (PLC). Operation and/or pump design conditions can be adjusted so as to enable a specific charge of metal to be outlet from the gear pump. Equipment including a touch screen display (e.g., to display a graphical user interface), other data input and output devices, optional computer, memory storage devices, power source, communications interfaces, and other electronic devices known to one of ordinary skill in the art may be electrically connected to the flow sensor, controller and/or motor to permit an operator to control operation of the motor to adjust and/or monitor the volume of charge.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:
1. A method of transferring molten fluid using a gear pump and self-cleaning the gear pump comprising:

providing a self-cleaning gear pump comprising:
  a base including an interior gear chamber, an inlet opening at a first side of said base, an outlet opening at a second side of said base, a passageway extending in a straight line from said inlet opening, through said gear chamber, to said outlet opening, molten fluid flowing in a direction along said passageway, and a shaft opening, said base being formed of refractory material and being adapted to be submerged in the molten fluid;
  a transfer conduit extending upward from said outlet opening of said base to above a surface of the molten fluid and to a remote location;
  two rotatable gears formed of refractory material and disposed in said gear chamber, one of said gears being a drive gear and another of said gears being a second gear, wherein said drive gear and said second gear engage each other while being rotated;
  a shaft formed of refractory material, said shaft passing through said shaft opening and a lower end of said shaft being fastened to said drive gear;
  a motor to which an upper end of said shaft is rotatably connected, said motor being supported above the molten fluid;
  a filter fastened to the first side of said base so as to cover said inlet opening and extending perpendicular to the molten fluid flow direction in said passageway, said filter being formed of refractory material that prevents particles and objects in the molten fluid from entering said gear chamber;
  wherein molten fluid flows in the direction along said passageway, and said flow is between said drive gear and said second gear;
conducting an operational mode in which said motor rotates said shaft and said drive gear whereby said drive gear and said second gear engage each other while rotating to positively displace molten fluid from said inlet opening through said passageway, to said outlet opening and along said transfer conduit to the remote location, a small amount of molten fluid remaining in said transfer conduit, and
  conducting a self-cleaning mode in which said motor rotates said shaft and said drive gear effective to remove the small amount of molten fluid remaining in said transfer conduit by positive displacement, through said outlet opening, along said passageway in the straight line to said inlet opening, thereby enabling the small amount of molten fluid to effectively clean said filter by backflushing, removing the particles adhering to said filter.

2. The method of claim 1 wherein said filter is formed of a ceramic foam.

3. The method of claim 1 wherein said filter is formed of a porous ceramic material.

4. The method of claim 1 wherein said drive gear and said second gear are formed of ceramic material.

5. The method of claim 1 comprising a flow sensor located only exterior to said transfer conduit adapted to transmit pulses into said transfer conduit and to receive pulses from said transfer conduit so as to enable determination of a flow rate of the molten fluid traveling in said transfer conduit and a volume of molten fluid that is transferred.

6. The method of claim 1 comprising:
  providing a die casting machine forming molten metal into metal articles of specific shapes, said die casting machine including an inlet portion for receiving a charge of molten metal to be formed;
  wherein said molten fluid is molten metal; and
  wherein in said operational mode said molten metal that is positively displaced along said transfer conduit is delivered as the charge of molten metal to the inlet portion of said die casting machine.

7. The method of claim 6 wherein said filter is formed of a ceramic foam.

8. The method of claim 6 wherein said filter is formed of a porous ceramic material.

9. The method of claim 6 wherein said drive gear and said second gear are formed of ceramic material and wherein a size thereof and at least one of a size, shape and pitch of teeth on said drive gear and said second gear are selected so that engagement of the teeth of said drive gear and said second gear produce said positive displacement resulting in said charge of molten metal.

10. The method of claim 6 comprising a flow sensor adapted to transmit and receive pulses into and from said transfer conduit that are used to determine a flow rate of molten metal in said transfer conduit and a volume of said charge, said flow sensor only being located exterior to said transfer conduit.

11. The method of claim 10 comprising a controller, wherein the determination of said flow rate and said charge volume using said transmitted and received pulses is carried out by said controller, enabling adjustment of said motor to rotate said gears for a duration that transfers said charge volume of molten metal into the inlet portion of said die casting machine.

12. The method of claim 1 wherein said molten fluid is molten aluminum or unfoamed molten aluminum.

13. The method of claim 1 wherein said gear pump comprises a boss functioning as a bearing extending from said drive gear and being adapted to be received in an opening in said base.

* * * * *